United States Patent [19]

Le Rouzic

[11] Patent Number: 5,486,665
[45] Date of Patent: Jan. 23, 1996

[54] SAFETY SWITCH FOR A FOOD PROCESSOR

[75] Inventor: Claude Le Rouzic, Montceau-Les-Mines, France

[73] Assignee: Robot-Coupe SNC, France

[21] Appl. No.: 230,908

[22] Filed: Apr. 21, 1994

[30] Foreign Application Priority Data

Apr. 30, 1993 [FR] France .................................. 93 05134

[51] Int. Cl.⁶ ................................................. H01H 13/06
[52] U.S. Cl. .................................................. 200/302.2
[58] Field of Search ........................................ 200/302.2

[56] References Cited

U.S. PATENT DOCUMENTS

| | | | |
|---|---|---|---|
| 1,907,688 | 5/1933 | Von Henke | 200/302.2 X |
| 3,586,810 | 6/1971 | Brown | 200/302.2 |
| 3,596,033 | 7/1971 | Wickham et al. | 200/302.2 |
| 4,168,408 | 9/1979 | Yamane | 200/302.2 X |
| 4,417,113 | 11/1983 | Saito et al. | 200/302.2 |
| 5,172,805 | 12/1992 | Gumb | 200/302.2 X |

FOREIGN PATENT DOCUMENTS 2147361  3/1973  France .

*Primary Examiner*—Renee S. Luebke
*Attorney, Agent, or Firm*—Eckert Seamans Cherin & Mellott

[57] ABSTRACT

The invention provides a safety switch device which is particularly adapted to increase the reliability a food processor. The switch has a piston which is slidably mounted inside a bore formed in a tapering projection in the base of the food processor so as to protect electrical circuitry inside the food processor from ingress of liquid or powder substances. The piston is spring biased and when depressed touches a contact device which is wired between an electrical power source and the food processor motor such that depression of the piston allows operation of the food processor motor. In operation the piston is depressed by a push-rod only when the bowl and the lid are properly installed on the food processor base. The piston is fitted with O-ring which resiliently seals between the piston and the bore. The piston is also formed with a skirt which surrounds and overlies a support for the contact device so that any liquid or powder substances which seep by the O-ring are directed away from the contact device.

3 Claims, 1 Drawing Sheet

SAFETY SWITCH FOR A FOOD PROCESSOR

The present invention relates to a safety switch, in particular for a food processor for preparing foodstuffs.

BACKGROUND OF THE INVENTION

Such appliances are known, and they enable various attachments such as chopping blades, grating and shredding disks, liquidizers etc. to be mounted inside a bowl, the attachments being rotated inside the bowl by an electric motor disposed in a base and having its shaft projecting into the bowl.

In certain household food processors, such as the one described in Patent FR-A-2 147 361 (Verdun), the motor is housed in a base, with the bowl being mounted on the base and therefore above the motor. The bottom of the bowl surrounds a base plate provided with lugs which are inserted into grooves when the bowl is mounted on the base, so that the bowl is held stationary in a determined position on the base.

It is essential for consumer appliances to be provided with safety means designed to prevent injuries to users. Such means are designed to prevent any contact between the hands of the user and an attachment that is rotating. Therefore, the appliance must be capable of operating only when the bowl is closed by its lid, the foodstuffs to be processed then being inserted into the bowl via a feed tube through which neither a hand nor even a finger can pass.

In the above-mentioned patent, such safety means are obtained by a safety rod which enables the appliance to operate, i.e. which enables the motor to be started, only when the bowl is properly attached to the base, and when the lid closing the bowl is in the closed position. In this way, it is impossible for there to be any contact between the hands of the user and an attachment that is rotating. In that known device, the push-rod, which is vertically movable under the action of a spring and of a cam provided on the lid, extends along a channel formed along a generator line of the cylindrical bowl. The spring is mounted in the bottom portion of the channel extending along a generator line of the cylindrical bowl. The spring automatically returns the push-rod to the high position as soon as the cam is released, thereby closing the switch for starting the motor.

The switch for starting the motor is included in the base. This means that the bottom portion of the push-rod has to pass through the top surface of the base so as to come into contact with the switch. The base is provided with a hole for that purpose. To prevent splashes of liquid from ingressing into the base, which could cause the motor to be damaged so that it no longer operates correctly, the hole is commonly shut off by a flexible membrane which becomes deformed under pressure from the push-rod, thereby enabling the push-rod to press against the control member of the switch.

Unfortunately, liquid, semi-liquid, or powder substances may be deposited on the membrane inside the hole in the base, and they may work their way down inside the base and into the electrical circuit, with the protective means then becoming less effective.

OBJECTS AND SUMMARY OF THE INVENTION

An object of the present invention is to mitigate the drawbacks of those known devices.

The present invention provides a safety switch for a food processor including a base on which a bowl closed by a lid is removably mounted, it being possible to drive various attachments inside the bowl via a drive shaft projecting through the bottom of the bowl, means for providing safe operation being constituted by the presence of a push-rod which comes into contact with a switch contained in the base when the lid is in position on the bowl, wherein it is controlled by a piston biassed by a spring.

According to another characteristic of the invention, the top of the piston is slidably mounted inside a tapering projection projecting from the surface of the base and the bottom of the piston is slidably mounted in a support that is fixed inside the base.

By means of the tapering projection, liquid, semi-liquid, or powder substances are kept away the opening. The piston further has a protective skirt overlying the switch support.

In this way, the switch is protected against any splashes of liquid. The projection provides first protection means against the ingress of liquids or dust into the base. When the push-rod is not engaged, the top surface of the piston almost entirely seals off the opening through the tapering projection. Second protection means for protecting the switch are constituted by the presence of a protective skirt which surrounds and overlies the switch support and the switch.

According to another characteristic of the invention, the piston has a cylindrical guide head whose diameter is equal to the inside diameter of the opening through the projection, a smaller-diameter piston body transmitting the pressure from the push-rod. In this way, friction is reduced to a minimum.

To increase the protection of the switch still further, it is possible to provide an O-ring or a scraper ring around the rod of the piston.

BRIEF DESCRIPTION OF THE DRAWING

Other characteristics and advantages of the invention will appear on reading the following description of particular embodiments given merely by way of non-limiting example, with reference to the accompanying drawing, in which.

MORE DETAILED DESCRIPTION

Figure 1:
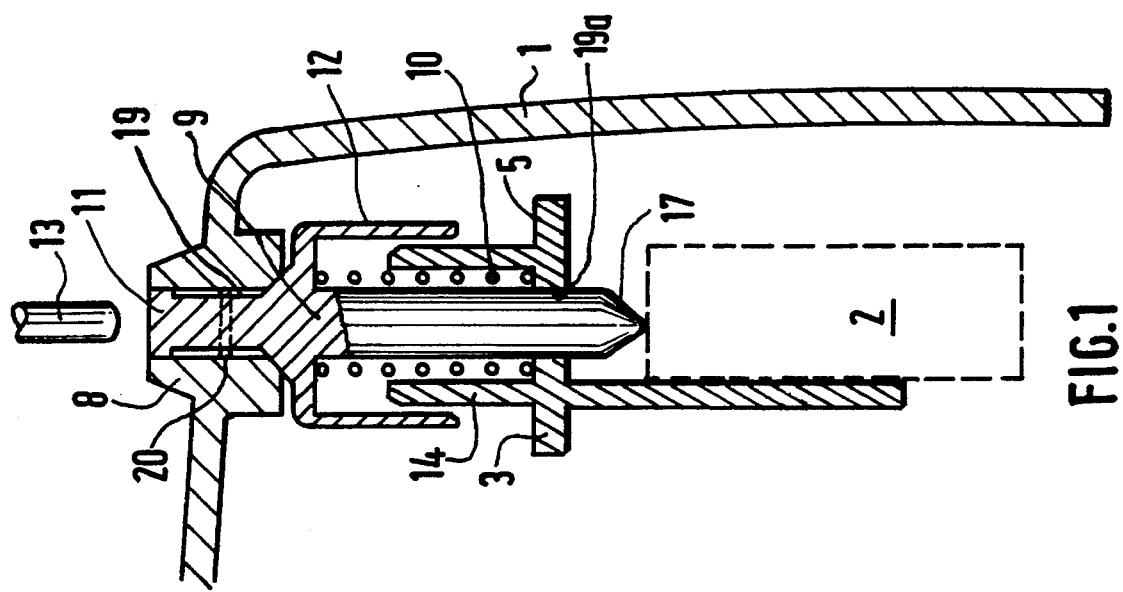
FIG. 1 is a view in vertical section through safety means mounted on a food processor, with the head of the piston being slidably mounted in a tapering projection.

FIG. 1 shows the base 1 which includes a motor (not shown) for which the electrical power circuit passes through a switch, a microswitch, or a contactor 2. The contactor 2 has a body and a button or pusher 18 and is mounted in a support 3 screwed inside the base.

FIG. 1 also shows a tapering projection 8 projecting from the top surface of the base or shell 1. The tapering projection is formed with a bore 19 having a bore axis. A piston 9 having a piston axis is mounted coaxially inside the bore. The resulting assembly 8, 9 constitutes the control for the contactor 2. The projecting design provides protection for the control circuit for starting the motor, which control circuit is disposed inside the base 1. The piston 9 is biassed by a spring 10 which bears against the support 3. The piston 9 includes a guide head 11 and a skirt 12.

The guide head 11 is slidably mounted inside the bore 19. The piston is movable between a depressed position and a released position. The length of the head 11 is deliberately short so that its contact with the bore 19 does not give rise to much friction. As a result, the piston 9 slides back up automatically under drive from the spring relaxing as soon as the pressure on the rod 13 is released. In the released position the guide head 11 is completely engaged in the bore 19 (i.e. the guide head does not protrude above the upper edge of the tapering projection).

FIG. 1 also shows that the skirt 12 surrounds the top wall 14 of the support 3. The plate 5 protects the contactor 2 from splashes and dust.

Figure 2:
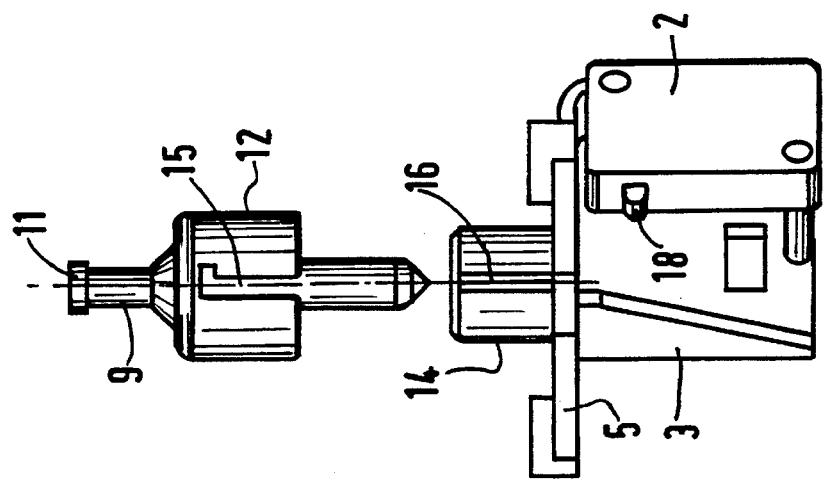
FIG. 2 is an exploded view of the same device.

FIG. 2 shows the device with the piston extracted to facilitate understanding. In addition to showing the above-mentioned elements, which have the same references, FIG. 2 shows that the skirt 12 has a longitudinal slot 15 which, during operation, slides along a ridge 16 on portion 14 of the support 3 so as to prevent the piston from rotating inside the cylinder forming the casing 19.

Figure 3:
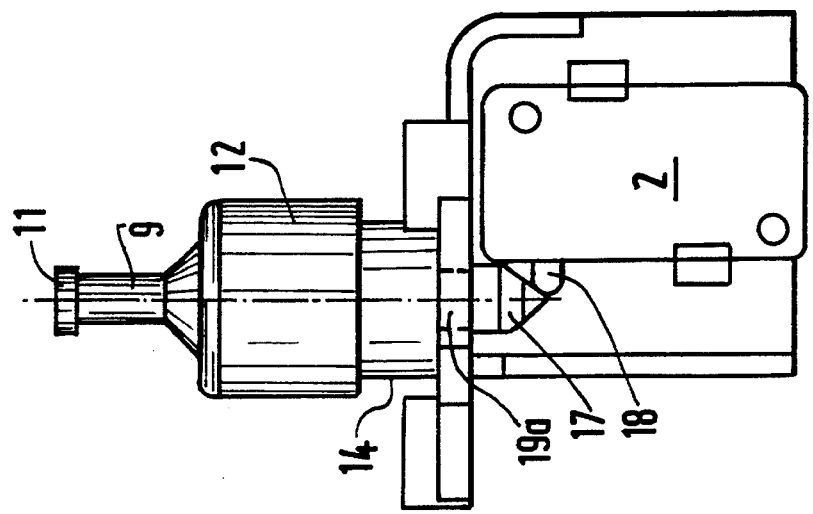
FIG. 3 is a front view of the device as mounted in the base.

FIG. 3 shows the body of the contactor is mounted adjacent to the bore axis.

When the piston 9 is in the depressed position, the top end of the piston recedes into bore 19 and the bottom end 17 comes into contact with the pusher 18. The plate 5 guides the piston 9 as shown in FIG. 3.

In this way, the piston is guided at its top by its head 11, and at its bottom by a bore 19a through the plate 5. Furthermore, the piston is prevented from rotating by the slot 15 in the skirt 12. In this way, it is extremely well guided in translation.

Even in the event of liquid or powder substances accidentally ingressing into the device, such substances cannot reach the contactor 2.

Safety may be improved by sliding an O-ring or scraper ring 20 over the rod 9 of the piston, as shown in dashed lines in FIG. 1.

Naturally, without going beyond the ambit of the invention, numerous variants may be made, in particular by replacing the above-described technical means with equivalent means.

I claim:

1. A safety switch in combination with a base for a food processor having a base with a surface on which a bowl closed by a lid is removably mounted, a plurality of drive attachments each being couplable inside the bowl via a drive shaft projecting through the bottom of the bowl, means for providing safe operation of a switch contained in the base in the form of a push rod having upper and lower ends, the lower end of the push-rod coming into contact with the switch when the bowl is properly attached to the base and the lid closing the bowl is in a closed position wherein:

the surface of the base is formed with a tapering projection formed with a bore having a bore axis, the tapering projection protruding from the surface of the base;

the switch has a piston having a piston axis and a contact means having a body and a pusher, the body being mounted adjacent to the bore axis, the piston having an upper and a lower end, the upper end of the piston being slidably engaged in the bore formed in the tapering projection such that the bore axis and piston axis are coaxial, the piston being movable between a depressed and released position such that the upper end of the piston remains completely engaged in the tapering projection when the piston is in the released position, the upper end of the piston being actuated by the lower end of the push rod such that the upper end of the piston recedes into the bore formed in the tapering projection when the piston moves towards the depressed position, the lower end being operable to bear on the pusher when the piston is in the depressed position;

a support fixture which is mounted to the base, the contact means being mounted to the support fixture, the support fixture being formed with a bore having a support fixture bore axis, which is coaxial to the bore axis, and in which the lower end of the piston is slidably engaged, the piston having a protective skirt overlying and surrounding a portion of the support fixture, and wherein the support fixture has a ridge which slidably engages a vertical slot formed in the skirt.

2. The combination of claim 1, wherein the upper end of the piston has a cylindrical guide head and a smaller diameter piston body, the cylindrical guide head having a diameter equal to the inside diameter of the bore formed in the tapering projection, the smaller diameter piston body transmitting pressure from the push-rod to the lower end of the piston.

3. The combination of claim 2, wherein an O-ring is mounted on the smaller diameter piston body, the O-ring providing a resilient seal between the smaller diameter piston body and the bore formed in the tapering projection.

* * * * *